United States Patent [19]
Blair

[11] Patent Number: 5,148,622
[45] Date of Patent: Sep. 22, 1992

[54] PERCH EYE FISHING LURE

[76] Inventor: Wayne R. Blair, 1399 Alleghany Rd., Attica, N.Y. 14011

[21] Appl. No.: 638,761

[22] Filed: Jan. 8, 1991

[51] Int. Cl.⁵ ............................................. A01K 85/01
[52] U.S. Cl. ....................................... 43/42; 43/42.06; 43/17.1; 43/42.32; 43/42.35
[58] Field of Search ............ 43/42, 42.32, 42.06, 43/42.31, 42.35, 17.1; 446/392

[56] References Cited

U.S. PATENT DOCUMENTS

| | | | |
|---|---|---|---|
| 2,596,201 | 5/1952 | Bocchino | 43/42.35 |
| 4,073,084 | 2/1978 | Favron | 43/42.35 |
| 4,324,066 | 4/1982 | Smith et al. | 46/165 |
| 4,601,673 | 7/1986 | Nasca | 446/389 |
| 4,637,159 | 1/1987 | Kulis | 43/42.32 |
| 4,823,497 | 4/1989 | Pierce | 43/17.6 |

*Primary Examiner*—Richard K. Seidel
*Assistant Examiner*—Jeanne M. Elpel
*Attorney, Agent, or Firm*—Terry M. Gernstein

[57] ABSTRACT

A fishing lure is sized and shaped to closely resemble an eye of a perch-type fish. The fishing lure is formed of plastics-type material, and includes mechanisms for increasing the ability of the lure to attract the attention of fish. These mechanisms include chemical dispersing mechanisms and sound generating mechanisms. The lure is used to ice fishing.

9 Claims, 5 Drawing Sheets

PERCH EYE FISHING LURE

TECHNICAL FIELD OF THE INVENTION

The present invention relates to the general art of amusement devices, and to the particular field of fishing lures.

BACKGROUND OF THE INVENTION

Fishing in general and ice fishing in particular, has become extremely popular in recent years. Over the years fishermen have tried many different types of lures in many different situations while attempting to catch fish.

It has been found that certain lures work better than others, and, of course, those types of lure have become quite popular. Perch eyes have been found to be especially effective in many situations. Therefore, many fisherman try to use perch eyes whenever possible.

While successful, the use of perch eyes has several drawbacks. For example, it may be difficult and onerous to obtain perch eyes of the proper size and shape. The fisherman may even have to catch perch, remove the eyes and then store those removed eyes for use. Not only is this difficult, even the most skillful fisherman may have difficulty in providing perch eyes that are perfectly sized and shaped for his particular use.

Even if the perch eyes are properly removed and used, they still are not fully effective in attracting fish.

Therefore, there is a need for a fishing lure that is in the shape of a perch eye but is consistently shaped and is in the most effective shape and form for luring fish, and also effectively lures fish.

OBJECTS OF THE INVENTION

It is a main object of the present invention is to provide a fishing lure that is in the shape of a perch eye It is another object of the present invention to provide a fishing lure that is in the shape of a perch eye but is consistently shaped.

It is another object of the present invention to provide a fishing lure that is in the shape of a perch eye but is consistently shaped and is in the most effective shape and form for luring fish.

It is another object of the present invention to provide a fishing lure that is in the shape of a perch eye but is consistently shaped and is in the most effective shape and form for luring fish, and also effectively lures fish.

SUMMARY OF THE INVENTION

These, and other, objects are achieved by a fishing lure that is shaped and sized to closely resemble the eye of a perch. The lure is artificial, thereby eliminating the need for catching actual perch and removing their eyes. The artificial nature of the lure also permits it to be consistent and designed to have the size and shape that are most effective in luring fish. The lure also is enhanced in certain manners to be even more effective than a simple perch eye whereby the overall fish luring capability of the device is enhanced.

It is known that fish often distinguish color according to brightness, and by varying the brightness of colors in a colored object, the fish can be attracted. This fact is utilized in the present invention by enhancing the contrast between certain ones of the colors of the artificial perch eye.

It is also known that fish often have an acute sense of hearing and have responded to sound waves up to 7000 Hz. Fish do react to various sounds in the water and pick up pressure waves or sounds from distances will beyond those at which objects can be seen. Various sounds in the water will attract fish while others may actually cause fish to flee. The device of the present invention utilizes this fact by producing various sounds that can be varied to attract fish.

It is also known that fish have a sensitivity to smell and taste. Fish have been known to be attracted by certain smells or other chemicals in the water. This fact, also, is used to enhance the fish-attracting capacity of the fish lure of the present invention.

BRIEF DESCRIPTION OF THE DRAWING FIGURES

DETAILED DESCRIPTION OF THE PREFERRED EMBODIMENT OF THE INVENTION

Figure 1:
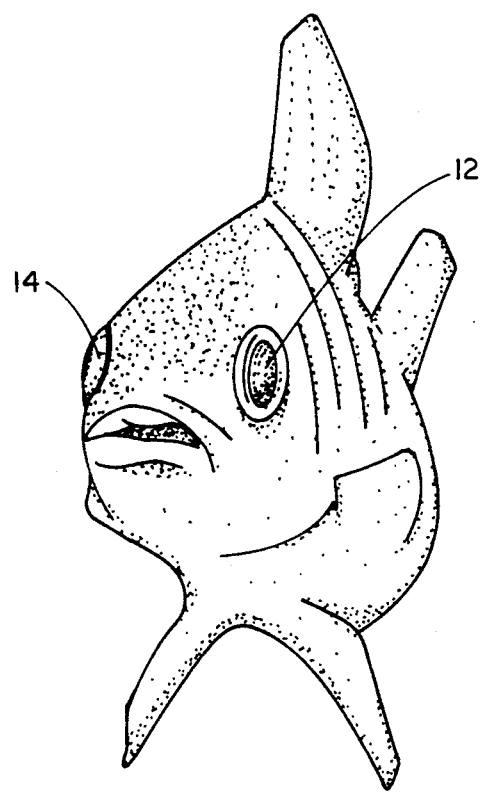
FIG. 1 is a front perspective view of a perch showing the eyes of that fish.

Shown in FIG. 1 is a perch 10 having two eyes 12 and 14, one on each side of its head. As was discussed above, perch eyes have been found to make efficient fish lures, especially in the field of ice fishing. In order to use such portions of the fish, a fisherman had to either catch a perch, remove the eyes and store those eyes, or purchase the eyes before he could use them for bait. Even if the eyes are removed by a skillful fisherman, they are not always uniform and effective.

Figure 2:
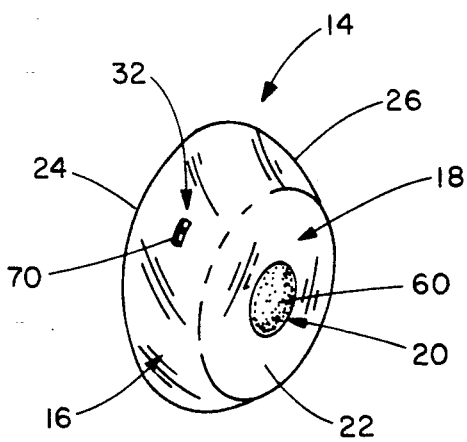
FIG. 2 is a perspective view of an artificial perch eye embodying the present invention.
Figure 9:
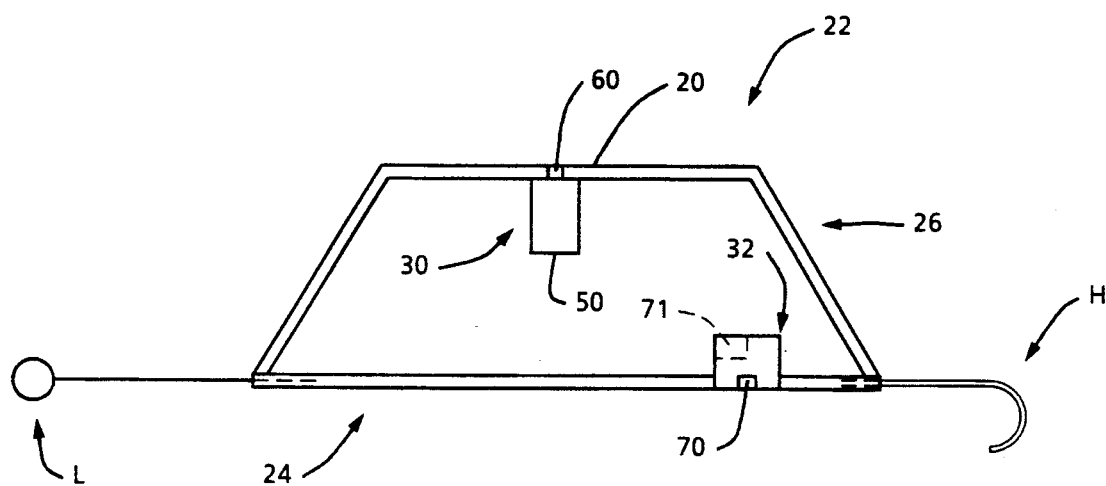
FIG. 9 is a cross sectional view of the artificial perch eye.

Accordingly, the present invention is embodied in an artificial perch eye 14, best shown in FIGS. 2 and 9. The artificial eye 14 is formed of plastics-type material and includes the usual parts of an eye, including a sclera portion 16, a cornea portion 18, and a pupil or iris portion 20. The sclera portion is formed to match the sclera portion of the actual perch eye 12, and is sized to be the most effective size. The pupil portion 20 is also sized and shaped to match the pupil portion of the perch eye 12.

The eye is hollow and includes a front end 22 and a rear end 24 connected together by an arcuate wall 26. The eye 14 is hollow and is watertight. In fact, the preferred form of the eye 14 is watertight. A hook element H and a line attaching element L are also shown in FIG. 9. The hook and line attaching elements can be fixed to the eye by adhesive or can be molded to the eye or embedded in the eye wall 24 as desired.

In order to take advantage of the fish's sense of color and brightness perception, the artificial eye 14 has the sclera portion a first color and the pupil portion a second color with the first and second colors being highly contrasting, such as white and black, respectively.

The artificial eye 14 also includes a chemical dispersing mechanism 30 located in the eye behind the pupil portion, and a sound generating mechanism 32 located on the sclera portion.

Figure 3:
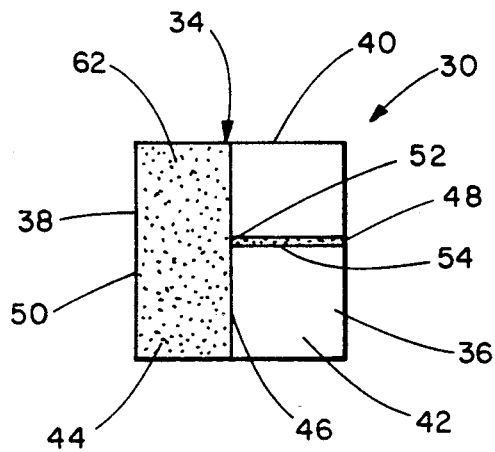
FIG. 3 is a side elevational view of a mechanism for placing a chemical in the water that will attract a fish either by means of the fish's smell or taste.
Figure 4:
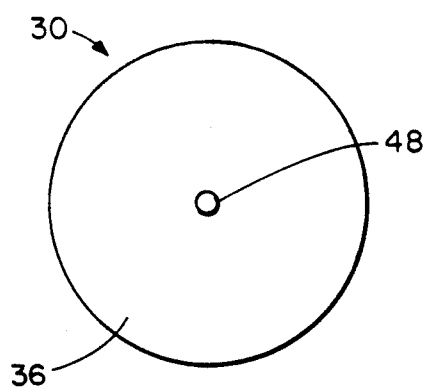
FIG. 4 is a front elevational view of the mechanism shown in FIG. 3.

The chemical dispersing mechanism disperses a liquid chemical into the water that is known to catch the attention of fish. One such chemical is beta-phenylethyl alcohol. The dispersing mechanism 30 is best shown in FIGS. 3 and 4. The mechanism includes a housing 34 having a front end 36 attached to an inner surface of the artificial eye adjacent to the pupil section, a rear end 38, and a circular sidewall 40 extending from the front end to the rear end. The housing 34 is hollow and is divided into two compartments 42 and 44 by a wall 46 that extends diametrically across the housing 34. The housing 34 is also monolithic and one piece to ensure watertightness. Both the front and the rear walls are identical, and thus only the front wall 36 is shown in FIG. 4. A port 48 is defined through the front wall 36, and a port 50 is defined through the rear wall. The dividing wall 46 also has a port 52 defined therethrough. A conduit 54 extends from the dividing wall port 52 to the front wall port 48 and fluidically connects the interior of chamber 44 to the exterior of the housing. A port 60 is defined through the eye housing in the pupil region, and is fluidically connected to the front wall port 48 to fluidically connect the exterior of the artificial eye to the chamber 44. As will be understood from the ensuing discussion, the port 50 is an inlet port while the ports 48 and 60 are exit ports.

A sponge-like material 62 is located in both the chamber 44 and in the conduit 54. The material 62 has a density which makes it able to hold a liquid and have that liquid move therethrough via a mass transfer process. A liquid is placed in the chamber 44 via the inlet port 50 and exits the artificial eye via the exit port 60. The liquid is of the type that gains a fish's attention such as the abovementioned beta-phenylethyl alcohol. The sponge-like material has a permeability to this liquid and to water such that the mass transfer flow constants cause a gradient to be established that causes the liquid to flow out of the chamber 44 toward the exit port when the artificial eye is placed in water. It has been found that a normal sponge material is sufficient to perform this function since the abovementioned beta-phenylethyl alcohol is much more mobile than water and will tend to diffuse toward and into the water surrounding the artificial eye.

As also mentioned above, the acute sense of hearing and feel exhibited by many fish is used to attract fish to the lure 14 in addition to the above-discussed elements. This sense is used by the sound producing mechanism 32. This mechanism includes a speaker 70 and a power source 71, both located in the eye and connected to the exterior thereof in a manner that permits sound to be generated from the speaker while retaining the watertight nature of the eye.

Figure 5:
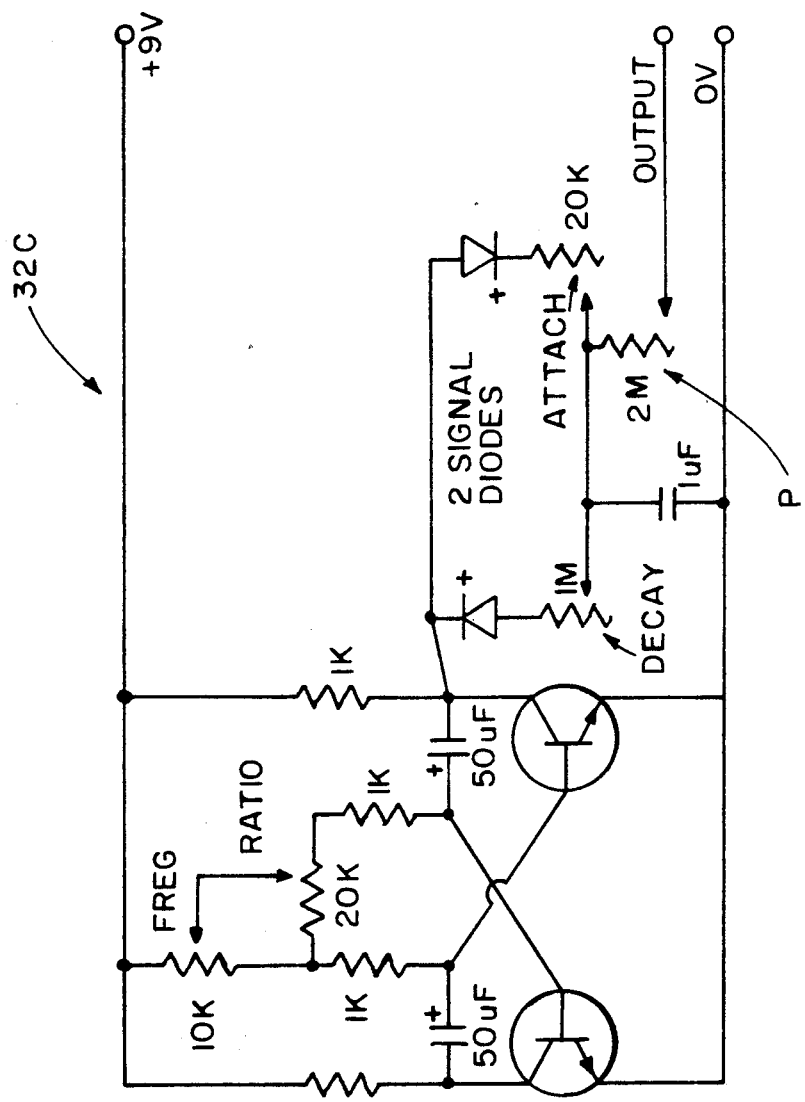
FIG. 5 is a circuit diagram of one form of a sound generator that can be used to attract fish by means of sound.
Figure 6:
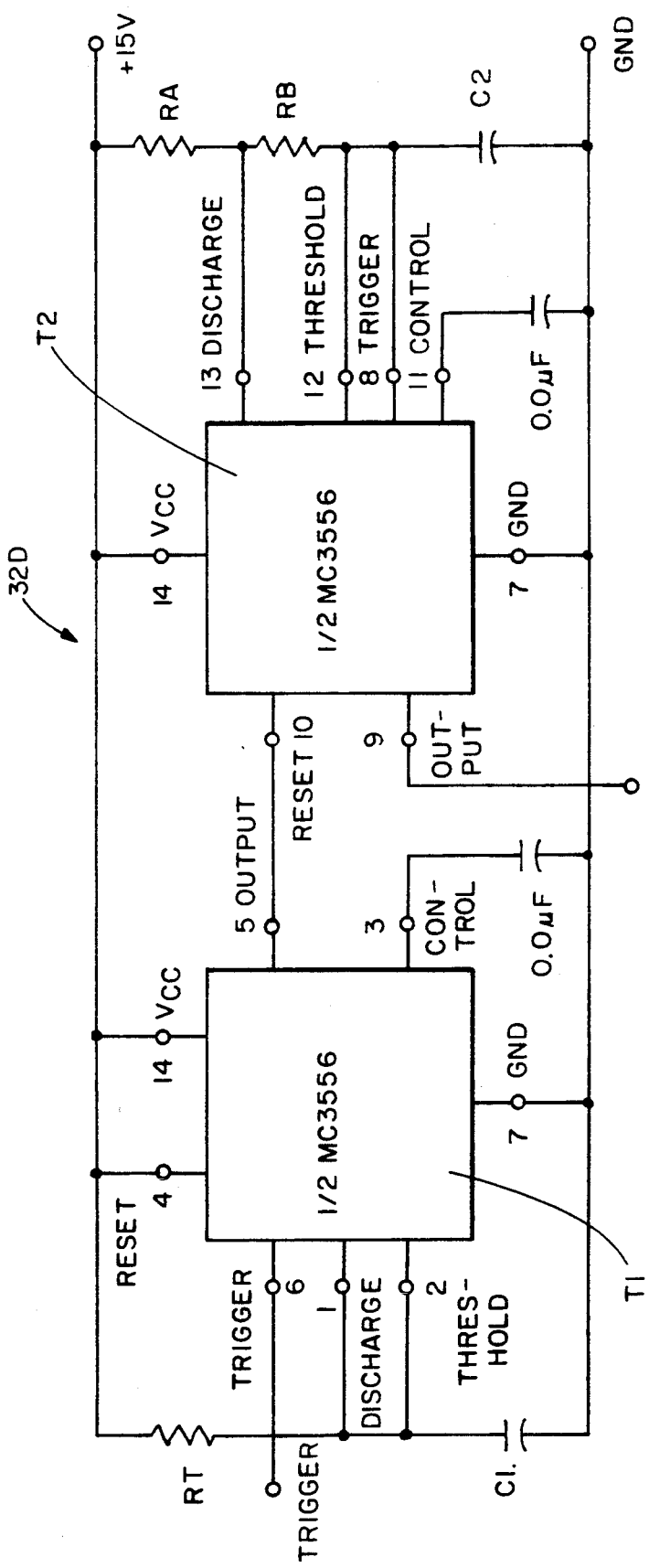
FIG. 6 is a circuit diagram of another form of a sound generator that can be used to attract fish by means of sound.

Since some sounds will attract certain fish while, possibly, scaring other fish, it is important that the sound producing mechanism be able to have the sound emitted thereby varied. This object is achieved by either of the two sound generator circuits shown in FIGS. 5 and 6. The circuit 32C shown in FIG. 5 is basically a slow running oscillator with variable attach and decay. A variable amplitude (high impedance) output is available via the potentiometer P. Various waveforms can be produced using the circuit 32C and the waveform that is most efficient for the particular application can be chosen.

The circuit 32D includes a first timer T1 that is used as a monostable and determines the tone duration when triggered by a positive pulse pin 76. A second timer T2 is enabled by the high output of the monostable. It is connected as an astable and determines the frequency of the tone. The frequency is selected by the fisherman as the one most likely to attract fish.

Figure 7:
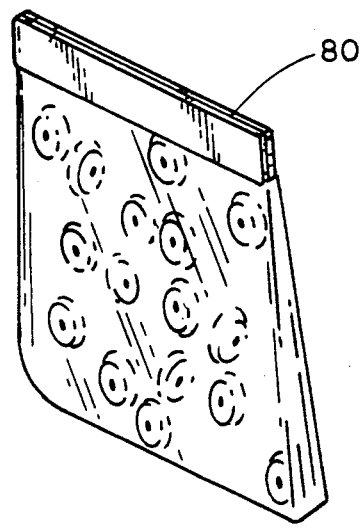
FIG. 7 is one form of packaging for the artificial perch eyes of the present invention.
Figure 8:
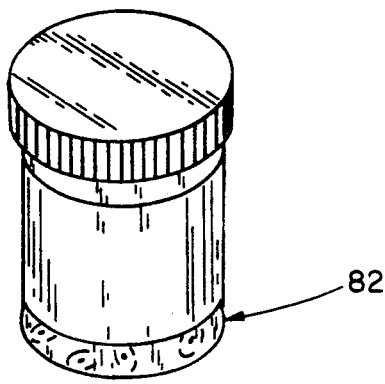
FIG. 8 is another form of packaging for the artificial perch eyes of the present invention.

Two different packaging concepts are shown in FIGS. 7 and 8. The artificial eyes can be sold in packages, such as package 80 shown in FIG. 7, or in jars, such as jar 82 shown in FIG. 8.

It is understood that while certain forms of the present invention have been illustrated and described herein, it is not to be limited to the specific forms or arrangements of parts described and shown.

I claim:

1. A fishing lure comprising:
    A) a hollow perch-eye shaped housing, said housing being formed of plastic and including a sclera portion, a cornea portion, and a pupil portion in said cornea portion, said cornea portion being a first color, said pupil portion being a second color, said second color being sharply contrasted to said first color;
    B) a sound generator in said housing; and
    C) a chemical dispersing means in said housing.

2. The fishing lure defined in claim 1 wherein said first color is white and said second color is black.

3. The fishing lure defined in claim 2 wherein said sound generator includes a speaker mounted on said sclera portion, a circuit means for producing selected tones, and a power source connected to said circuit means.

4. The fishing lure defined in claim 3 wherein said chemical dispersing means includes a hollow container mounted inside said housing, said container including a first end, a second end, a cylindrical wall connecting said first end to said second end, a divider wall in said container dividing said container into a first chamber and a second chamber, a first port defined in said first wall, a second port defined in said second wall and a third port defined in said divider wall, a conduit connecting said first port to said third port, and a sponge material located in said first chamber between said divider wall and said second wall and in said conduit.

5. The fishing lure defined in claim 4 wherein said housing includes an exit port defined in said pupil portion, said housing exit port being fluidically connected to said container first port.

6. The fishing lure defined in claim 5 further including a fish attention attracting chemical in said sponge material.

7. The fishing lure defined in claim 6 wherein said fish attention attracting material is beta-phenylethyl alcohol.

8. The fishing lure defined in claim 7 wherein said sound generator circuit includes a first timer which is connected in said circuit to be a monostable, a second timer which is connected in said circuit to be an astable.

9. The fishing lure defined in claim 7 wherein said sound generator circuit includes a potentiometer.

* * * * *